US007224703B2

United States Patent
Antal et al.

(10) Patent No.: US 7,224,703 B2
(45) Date of Patent: May 29, 2007

(54) METHOD AND APPARATUS FOR SEGMENTING A DATA PACKET

(75) Inventors: Csaba Antal, Kiskunlacháza (HU); Bengt Henriques, Stockholm (CH); Gábor Tóth, Kisgyör (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 952 days.

(21) Appl. No.: 10/012,348

(22) Filed: Dec. 12, 2001

(65) Prior Publication Data

US 2003/0110286 A1  Jun. 12, 2003

(51) Int. Cl.
*H04J 3/24* (2006.01)
(52) U.S. Cl. .................. 370/473; 370/474; 370/468
(58) Field of Classification Search ............... 370/392, 370/473, 474, 470, 471, 468, 537, 538
See application file for complete search history.

(56) References Cited

U.S. PATENT DOCUMENTS

| | | | |
|---|---|---|---|
| 5,541,919 A | 7/1996 | Yong et al. | |
| 5,802,051 A * | 9/1998 | Petersen et al. | 370/395.42 |
| 5,809,254 A * | 9/1998 | Matsuzono | 709/235 |
| 5,822,321 A * | 10/1998 | Petersen et al. | 370/474 |
| 6,032,272 A * | 2/2000 | Soirinsuo et al. | 714/706 |
| 6,212,190 B1* | 4/2001 | Mulligan | 370/400 |
| 6,215,789 B1* | 4/2001 | Keenan et al. | 370/399 |
| 6,243,382 B1* | 6/2001 | O'Neill et al. | 370/395.52 |
| 6,327,626 B1* | 12/2001 | Schroeder et al. | 709/236 |

(Continued)

FOREIGN PATENT DOCUMENTS

| WO | WO 99/04521 | 1/1999 |
|---|---|---|
| WO | WO 01/26326 A1 | 4/2001 |

OTHER PUBLICATIONS

"Link Efficiency Mechanisms Overview" Cisco IOS Quality of Service Solutions Configuration Guide, 'Online! Aug. 16, 2000, pp. 209-214, XP002209683, <URL:http:/ /web.archive.org/web/20020811200221/http:/ /www.cisco.com/univercd/cc/td/doc/product/software/ios121/121cgcr/qos_c/qcprt6/qcdlem.pdf> 'retrieved on Aug. 12, 2002.

(Continued)

*Primary Examiner*—Wing Chan
*Assistant Examiner*—Andrew C. Lee
(74) *Attorney, Agent, or Firm*—Nixon & Vanderhye P.C.

(57) ABSTRACT

The efficiency of transmitting lower priority data traffic along with higher priority traffic is improved by segmenting a data packet in such a way so as to reduce transmission delay of the higher priority traffic. The data packet is segmented so that all its segments, including the last segment, are approximately the same size. The segment size is set smaller than a maximum permitted segment size. Indeed, it is desirable (though not necessary) to set the segment size as small as design parameters, (e.g., minimize segment header overhead), allow in order to reduce transmission delay of the higher priority traffic. Because the last segment is set at the same size or a larger size than the other segments, delay in transmitting the data packet is also reduced. The last segment may be sized as large as practical to minimize the transmission delay of the data packet. Once segmented, the data packet segments are transmitted along with the higher priority traffic.

34 Claims, 7 Drawing Sheets

U.S. PATENT DOCUMENTS

| | | | |
|---|---|---|---|
| RE37,494 E * | 1/2002 | Cantoni et al. | 370/395.6 |
| 6,522,651 B2 * | 2/2003 | Herrmann | 370/395.2 |
| 6,564,267 B1 * | 5/2003 | Lindsay | 709/250 |
| 6,654,376 B1 * | 11/2003 | Stacey et al. | 370/395.21 |
| 6,721,271 B1 * | 4/2004 | Beshai et al. | 370/232 |
| 6,721,335 B1 * | 4/2004 | Gregg | 370/473 |
| 6,804,251 B1 * | 10/2004 | Limb et al. | 370/444 |
| 6,819,658 B1 * | 11/2004 | Agarwal et al. | 370/316 |
| 6,857,096 B1 * | 2/2005 | Braneci et al. | 714/751 |
| 6,859,442 B1 * | 2/2005 | Agarwal et al. | 370/316 |
| 6,907,001 B1 * | 6/2005 | Nakayama et al. | 370/230 |
| 6,961,326 B1 * | 11/2005 | Chang et al. | 370/338 |
| 2002/0041592 A1 * | 4/2002 | Van Der Zee et al. | 370/389 |

OTHER PUBLICATIONS

"Copper Mountain Announces Optimized DSL Efficiency and Voice Quality for Voice Over DSL via Adaptive Fragmentation Features" Coppermountain Press Release, 'Online! May 16, 2000, pp. 1-4, XP002209684, Palo Alto, Calif, <URL:http:/ /www.coppermountain.com/ news/05162000pr.cfm> 'retrieved on Aug. 12, 2002.

Gilbert HELD: "Bandwidth and Latency: The Network Duo of Network Performance" Sysadmin, 'Online! vol. 6, No, Dec. 1997, pp. 1-10, XP002209685, <URL:http:/ /www.unixplumber.com/ sysadmin/html/v06/i12/v06i12.htm> 'retrieved on Aug. 12, 2002.

* cited by examiner

*Voice delay as a function of MSS*

Fig. 10

*Data delay as a function of MSS*

Fig. 11

METHOD AND APPARATUS FOR SEGMENTING A DATA PACKET

FIELD OF THE INVENTION

The present invention relates to data communications, and more particularly, to data communications in which multiple service classes are supported.

BACKGROUND AND SUMMARY OF THE INVENTION

The Internet is a collection of interconnected networks, all of which use the Internet Protocol (IP). The connections between these networks can be used to support a wide range of applications including, for example, electronic mail, file transfer, electronic commerce, downloading of web site information, and voice over IP. Different types of IP services may require different qualities of service. Quality of service (QoS) is the level of assurance that the network can meet a particular application's service requirements. From a technical perspective, quality of service can be characterized by several performance criteria such as availability, throughput, setup time, percentage of successful transmissions, etc., and can be measured in terms of bandwidth, packet loss, delay, and jitter. In an IP header, one of the fields typically corresponds to a traffic class, which enables different types/classes of traffic to be differentiated from others. A higher level traffic class corresponding to a higher quality of service may be given a higher priority than a lower level traffic class with a lower QoS. For example, real-time applications such as voice might be given a higher priority than other non-real-time applications such as e-mail.

In IP networks that support multiple quality of service classes, there may be situations when one traffic class with stricter delay requirements is multiplexed with another traffic class with less strict delay requirements. For example, voice traffic has strict delay requirements while certain types of data traffic typically has less strict delay requirements. In such a situation, even though the voice traffic has priority over the data traffic, the delay of voice packets is nonetheless influenced by the size of the data packets. At the start of transmission of a large data packet, a voice packet cannot be sent until transmission of that large data packet is finished. For example, if the size of the data packet is one kilobyte and the transmission rate is 64 kbps, the next voice packet to be transmitted in the multiplexed transmission may be delayed by as much as 125 milliseconds.

Accordingly, the way in which IP packets are sized or the way in which IP packets are fragmented/segmented for transmission may affect delay and other service parameters. One example algorithm for fragmenting packets is the point-to-point protocol (PPP) multilink protocol (MP) described in an IETF RFC written in 1990 by K. Sklower et al. entitled, "The PPP Multilik Protocol W)." The RFC indicates that systems implementing the multilink procedure are not required to segment packets, although segmentation may be performed. Segmenting longer, lower priority data packets may prevent transmission delays of a voice packet on a multiplexed transmission link. However, no segmenting algorithm is described in the RFC.

One simple approach to segmenting data packets for multilink procedures, (as well as for other procedures), is to divide the packet into segments of equal size, with all of the segments having the maximum segmentation size possible. More than likely, some portion of the packet smaller than the maximum segmentation size will make up the last packet segment. Unfortunately, this relatively simple segmentation procedure does not take into account how it impacts transmission delays for both the voice and data.

Figure 1:
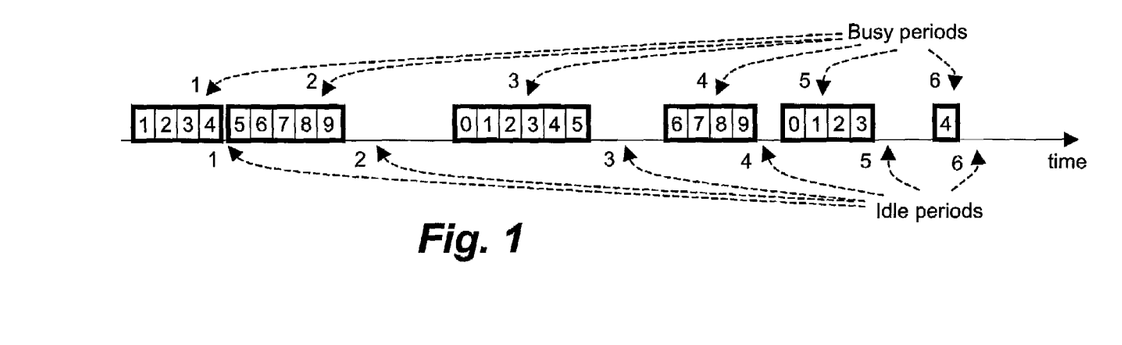
FIG. 1 illustrates the output of the voice queue in FIG. 1 when data packet traffic is not present in the data queue.

Consider the example in FIG. 1 which shows the output of a voice buffer or queue when there is no data traffic to be transmitted over a multiplexed link A first voice burst includes four packets separated by a very brief idle period from a second voice burst that contains five voice packets. A considerably longer idle period separates the second and third voice bursts, the third voice burst having five data packets, etc. FIG. 2 illustrates a situation where data traffic is interspersed in the transmission with the voice traffic. The timing of transmission of the original voice burst when there is no data traffic is illustrated in dotted blocks for comparison to the multiplexed transmission. The data packet is segmented into four segments, with segments 1, 2, and 3 having the same segment size, and the last segment 4 having a much smaller size.

Figure 2A:
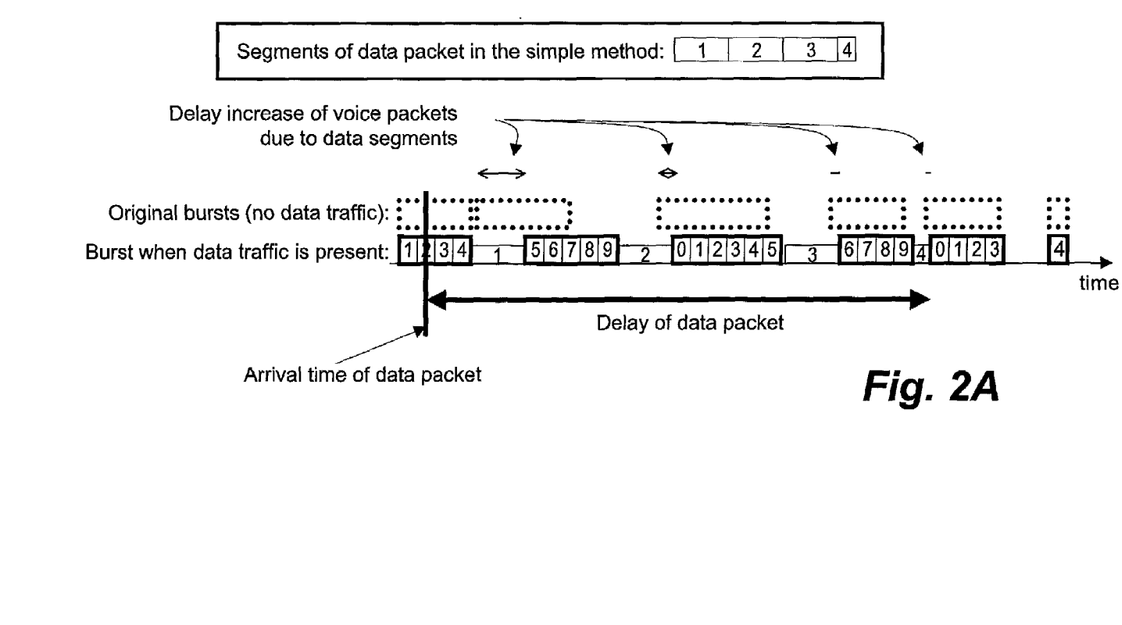
FIGS. 2A–2C illustrate the output of the scheduler 20 in FIG. 1 when data traffic is multiplexed with the voice for different packet segment sizes.

As can be seen in FIG. 2A, the five packets in the second voice burst are uniformly delayed by the time it takes to transmit the first data packet segment minus the duration of the first idle period. If the idle period were longer, the delay in transmitting the voice packets in the second burst would be shorter. Segment 1 of the data packet could have increased the delay of the corresponding burst by a value uniformly distributed between 0 and the segment size. This is the case for all other segments. In other words, large data segments are more likely to cause longer voice delays.

Figure 2B:
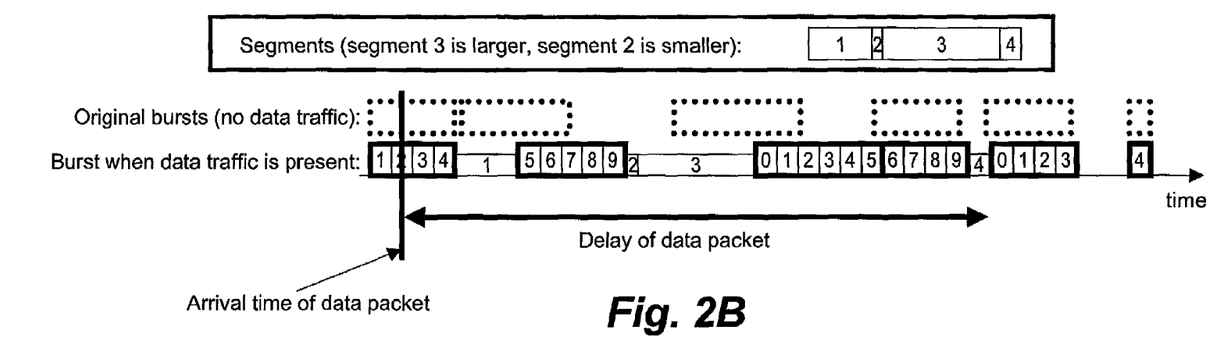
Figure 2C:
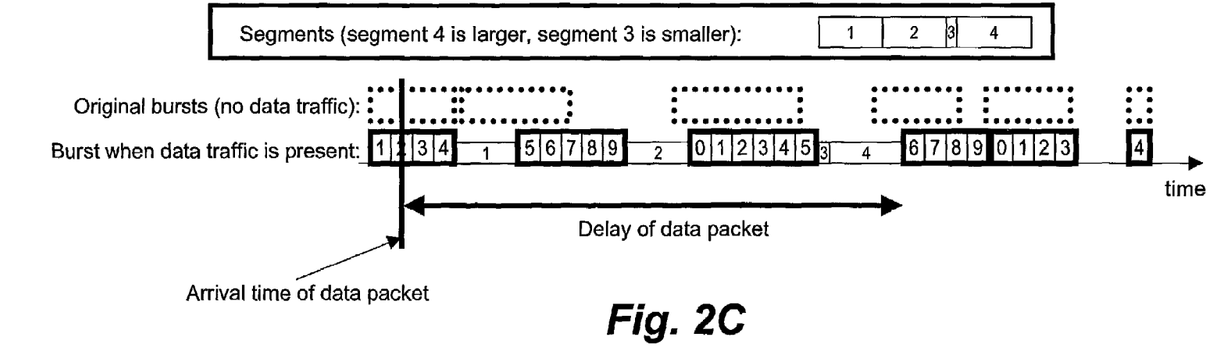

To better understand how segmentation affects the delay of the segmented packet, examine two other segmentation options. FIG. 2B shows a situation where the size of Segment 3 is increased and the size of Segment 2 is decreased by the same amount of bytes. Although the delay of the third voice burst is reduced, the overall delay of the data packet remains the same. FIG. 2C shows that when the size of the last segment is increased, the delay of the data packet decreases. Thus, the delay of the last segment corresponds to the delay of the complete packet and depends on the size of the last segment, assuming the packet size does not change. Accordingly, in to achieve lower delay for the data packet, the last segment should be as large as possible. For lower voice delay, the largest data packet segments should be as small as possible.

Figure 3:
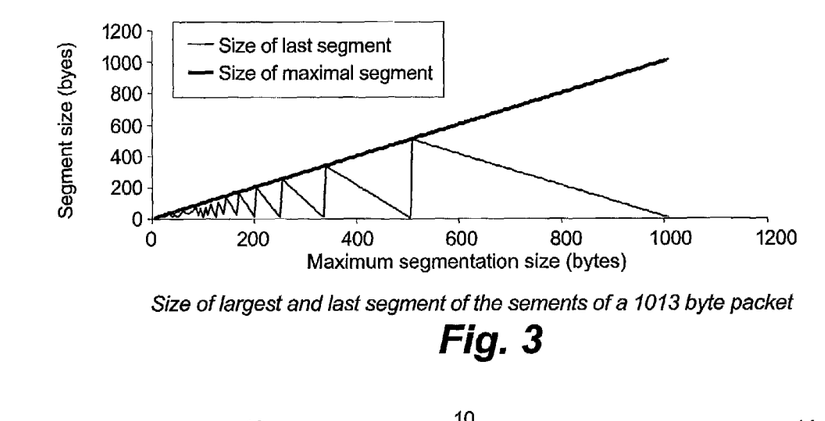
FIG. 3 is a graph illustrating segment size versus maximum segmentation size for both the last segment and the largest/maximal segment in a segmentation approach where the maximum segmentation size is employed.

FIG. 3 shows a graph where the size of the last segment and the size of the largest segment for a 1013-byte data packet is plotted as a function of maximum segmentation size in the case where a maximum segmentation algorithm is used. Using this maximum segmentation algorithm is not optimal because the last segment ends up being smaller than the maximum size. Indeed, in some situations, the last segment is very small which corresponds to a longer, "worst case" delay of data packets.

More formally, if the size of the last segment is denoted by L, the packet size by P, and the bit rate of the multiplexed link by C, the time needed to transmit the last data packet segment is L/C. The time needed for transmission of the data packet is $(T_1+T_2)$, where $T_1$ is the time when the sum of idle times between voice bursts is equal to (P−L)/C, and $T_2=L/C$. Therefore, the delay of the data packet is minimal if the size of last segment is maximized.

Based on these recognitions, two general rules are employed to characterize how the segmentation size of data packets influences delays in the voice/data multiplex transmission. First, a worst case delay increase of higher priority voice packets is reduced when the size of the largest data segment is reduced. Second, the delay of low priority data packets is reduced when the size of the last data segment, (not the size of the largest segment), is increased relative to the size of the other segments of the data packet.

The efficiency of transmitting lower priority data traffic along with higher priority traffic is improved by segmenting a data packet in such a way so as to reduce transmission delay of the higher priority traffic. The data packet is segmented so that all its segments, including the last segment, are approximately the same size. The segment size is set smaller than a maximum permitted segment size. However, there may be reasons not to set that size too small. For example, because each includes a protocol header, the total "overhead" of the data packet transmission is proportional to the number of segments. To reduce such overhead, the number of segments should preferably be kept to the minimum number allowed by the maximum permitted segment size. Thus, it is desirable (though not necessary) to set the segment size as small as design parameters allow in order to reduce transmission delay of the higher priority traffic but at the same time not increase overhead associated with segment headers. Because the last segment is set at the same size or a larger size than the other segments, delay in transmitting the data packet is also reduced. The last segment may be sized as large as practical to minimize the transmission delay of the data packet. Once segmented, the data packet segments are transmitted along with the higher priority traffic.

One example, non-limiting implementation employs a relatively simple algorithm. Initially, an overall size of the data packet to be transmitted is determined. First and second segment sizes are determined for the data packet. The first and second segment sizes are determined to reduce the delay in transmitting the higher priority traffic, transmitting the data packet, or both. The data packet is segmented into plural segments at the first segment size and a last segment at the second segment size. The higher priority traffic is multiplexed along with the data packet segments. The first segment size is smaller than the maximum allowed segment size, and all of the data packet segments except the last segment are the same first segment size. Although the last segment may be the same size as the first segment size, the second segment size is preferably larger than the first segment size.

The examples above, described with two priority levels of traffic, may be applied to multiplexed transmissions with three or more traffic priority levels. Two detailed, non-limiting, examples of how to implement the basic segmenting algorithm are described below. In general, the first example emphasizes delay reduction for higher priority traffic, while the second example emphasizes delay reduction for the lower priority data packet segments. However, both the first and second segmentation examples achieve delay reductions for both the high priority and data packet traffic.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while the example embodiment described below relates to voice traffic and low priority data traffic, the present invention may be applied to any types of traffic in a communications system that offers communication services with different qualities of service, priorities, etc.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 4:
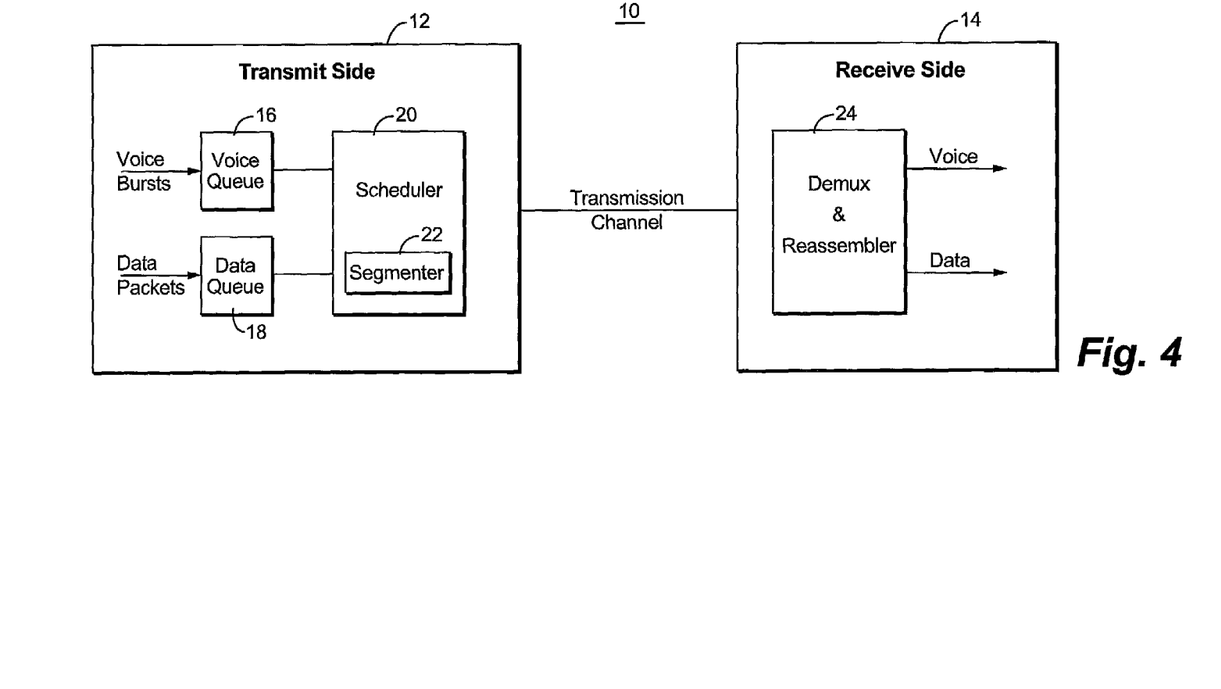
FIG. 4 is a simplified block diagram of a communications system where bursts and data packets are multiplexed over a transmission channel and in which the present invention may be employed.

The present invention may be employed in any communications system where different classes/types/priorities of traffic are multiplexed onto or otherwise share a transmission channel. Consider the simplified, example communications system 10 shown in FIG. 4 that includes a transmit side 12 which sends packet information over a channel to a receive side 14. The transmit side 12 includes a voice queue 16 for storing higher priority voice bursts/packets and a data queue 18 for storing lower priority data packets. A scheduler 20 receives the higher priority voice bursts as well as the lower priority data packets and employs a segmenter 22 for segmenting data packets received from the data queue 18 before multiplexing data packet segments received from the segmenter 22 with the voice bursts before transmission over the channel. The receive side includes a demultiplexer and reassembler 24 which extracts the voice packets and directs them to a voice output as well as reassembles the packets segments into a data packet and directs that reassembled data packet to a data output.

Optimal segmentation is determined for a data packet of a lower priority or traffic class when information from a higher priority class is transmitted along with segments of the lower priority data packet. Such segmentation may also be employed when there are three or more different traffic classes/priority levels QoS's. However, for simplicity, and not for limitation, the following description employs the example of two traffic classes characterized as higher priority traffic, e.g., voice, and lower priority traffic, e.g., data.

Although various optimal segmentation algorithms with specific procedures are described below, the present invention is not limited to the details of a particular segmentation algorithm. Rather, the present invention follows two guidelines. First, to reduce delay of a higher priority traffic class, the largest packet size of the lower priority data packet should be reduced. Ideally, the largest packet size should be reduced as small as possible. However, in practice, this goal may be limited to ensure that the number of segments is not unduly increased. As explained above, if the number of segments is larger then needed, the overhead for the packet increases because a segment header is needed for each segment. Thus, it is preferred (but not necessary) that the packet be segmented into as few segments as the maximum segment size allows while minimizing the size of each of those segments in that minimum number. Second, the delay of the lower priority traffic is reduced when the size of the last data segment is increased. Ideally, the last data segment size should be increased as large as possible or practical within design constraints. Thus, both high priority and low priority traffic delays may be reduced if the last segment size is larger than the other segments, and the other segments have approximately the same relatively small size. If the number of segments is determined as the smallest value allowed by the maximum allowed segment size, the largest segment is as small as possible when all of the segments are of equal size.

Figure 5:
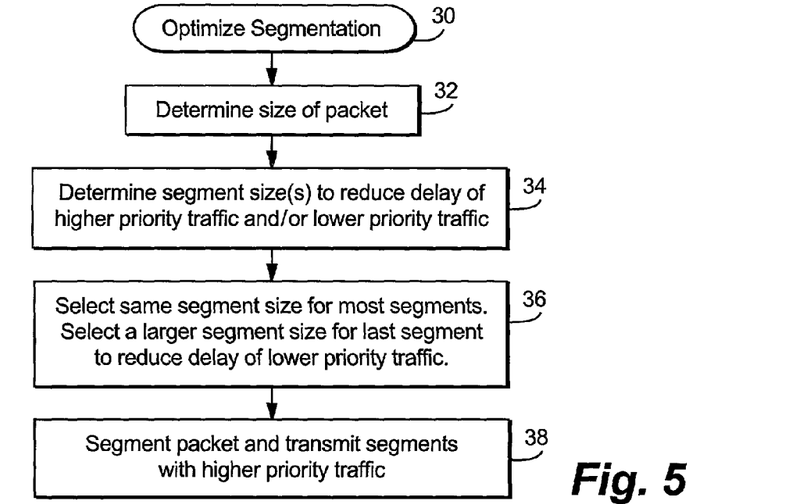
FIG. 5 illustrates an Optimized Segmentation routine in accordance with an example embodiment of the present invention.

Referring now to one example procedure entitled Optimize Segmentation (block 30) shown in FIG. 5, the overall size of the lower traffic class packet to be transmitted is determined (block 32). One or more segment sizes is then determined to reduce the delay of the higher priority traffic and/or the lower priority traffic (block 34). These first two steps define the basic optimized segmentation methodology in accordance with a general example embodiment of the present invention. However, additional steps are shown in FIG. 5 that may be desirably performed. For example, in block 36, the same segment size is selected for most segments of the data packet from the lower traffic class, with that segment size being preferably as small as practical within other system design constraints. In addition, a larger segment size is selected for the last segment to reduce the delay of the lower priority traffic data packet. The packet is segmented accordingly, and the segments are transmitted with the higher priority traffic packets in multiplexed fashion (e.g., similar to the example shown in FIG. 2) over a communications channel (block 36). One example multiplex communication environment is that described above for networks that support multiple service classes and employ the PPP multilink protocol. However, any protocol that segments packets may be used, such as segmentation at the IP level.

Using the procedures described above, the traffic delay associated with a system that carries two or more traffic classes is decreased both for the higher and lower priority traffic. Furthermore, this reduced traffic delay is easy to implement using a variety of relatively simple segmentation algorithms, two examples of which are described below.

Any segmentation algorithm that follows the guidelines set forth above may be employed. A first example, non-limiting segmentation algorithm is now described that segments the data packet into equal size segments. A predetermined segment size parameter, e.g., a maximum segment size (MSS) defined for the lower priority traffic class, is used to calculate a number of segments "n." More formally, the number of segments $$n = ceil\left[\frac{P}{MSS}\right],$$

where ceil[ ] denotes rounding to the next larger integer if $$\frac{P}{MSS}$$

results in an integer plus a remainder. A number of "large" segments $n_1 = mod(P, n)$, where mod denotes the remainder of the division $$\frac{P}{n}.$$

A number of "small" segments $n_2 = n - n_1$. The size of one or more large segments $$S_1 = ceil\left[\frac{P}{n}\right]$$

and the size of the small segments $$S_2 = floor\left[\frac{P}{n}\right],$$

where floor denotes rounding to the next smaller integer if $$\frac{P}{n}$$

results in an integer and a remainder. The first $n_2$ segment is small, and the remaining $n_2$ segments are large. The difference between large and small segments is one byte. It may be desirable in some situations to set the first segment size to a size larger than the maximum segment size that will be applied on a packet. In this case, two different maximum segment sizes will be used. The first segment will be set to a predetermined value, and a segmentation algorithm is applied to the rest of the packet.

Figure 6:
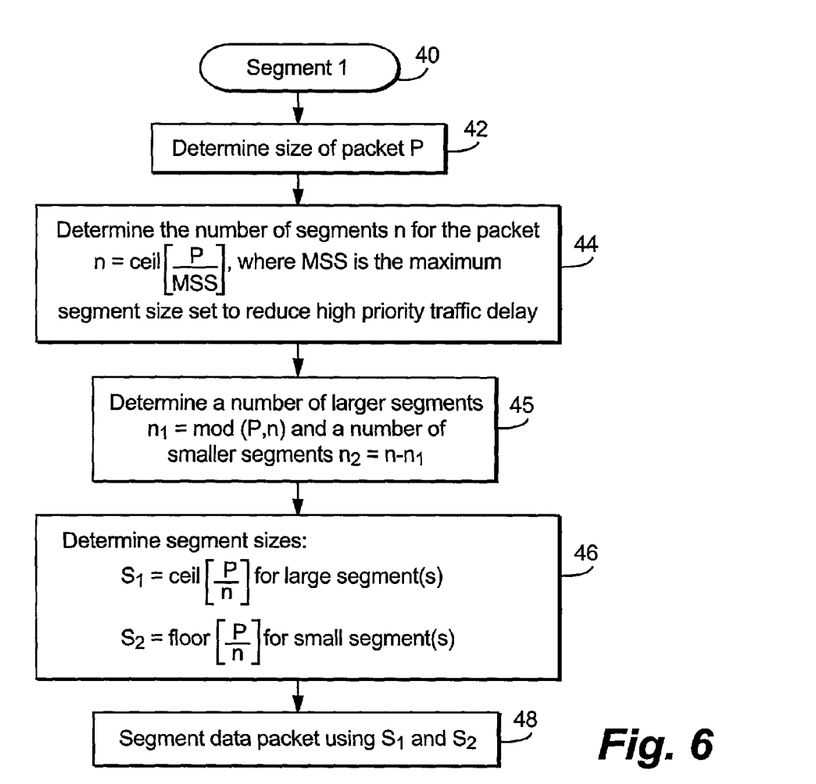
FIG. 6 illustrates details of one example segmentation algorithm.

FIG. 6 illustrates a "Segment 1" routine (block 40) illustrated in flowchart format in accordance with the first segmentation algorithm. The size of the packet P is determined (block 42). The number of segments n is determined for the lower priority packet in accordance with $$n = ceil\left[\frac{P}{MSS}\right],$$

where MSS is the maximum segment size set to reduce high priority traffic delay (block 44). A number of larger segments $n_1 = mod(P, n)$ and a number of smaller segments $n_2 = n - n_1$ are calculated (block 45). Segment sizes $S_1$ and $S_2$ are determined in accordance with the equations:

$$S_1 = ceil\left[\frac{P}{n}\right]$$

for large segment(s) and $$S_2 = floor\left[\frac{P}{n}\right]$$

for small segment(s) (block 46). The data packet is segmented using the segment sizes $S_1$ and $S_2$ (block 48). The first $n_1$ packet segments are set to size $S_1$. The last $n_2$ segments are set to size $S_2$.

Figure 7:
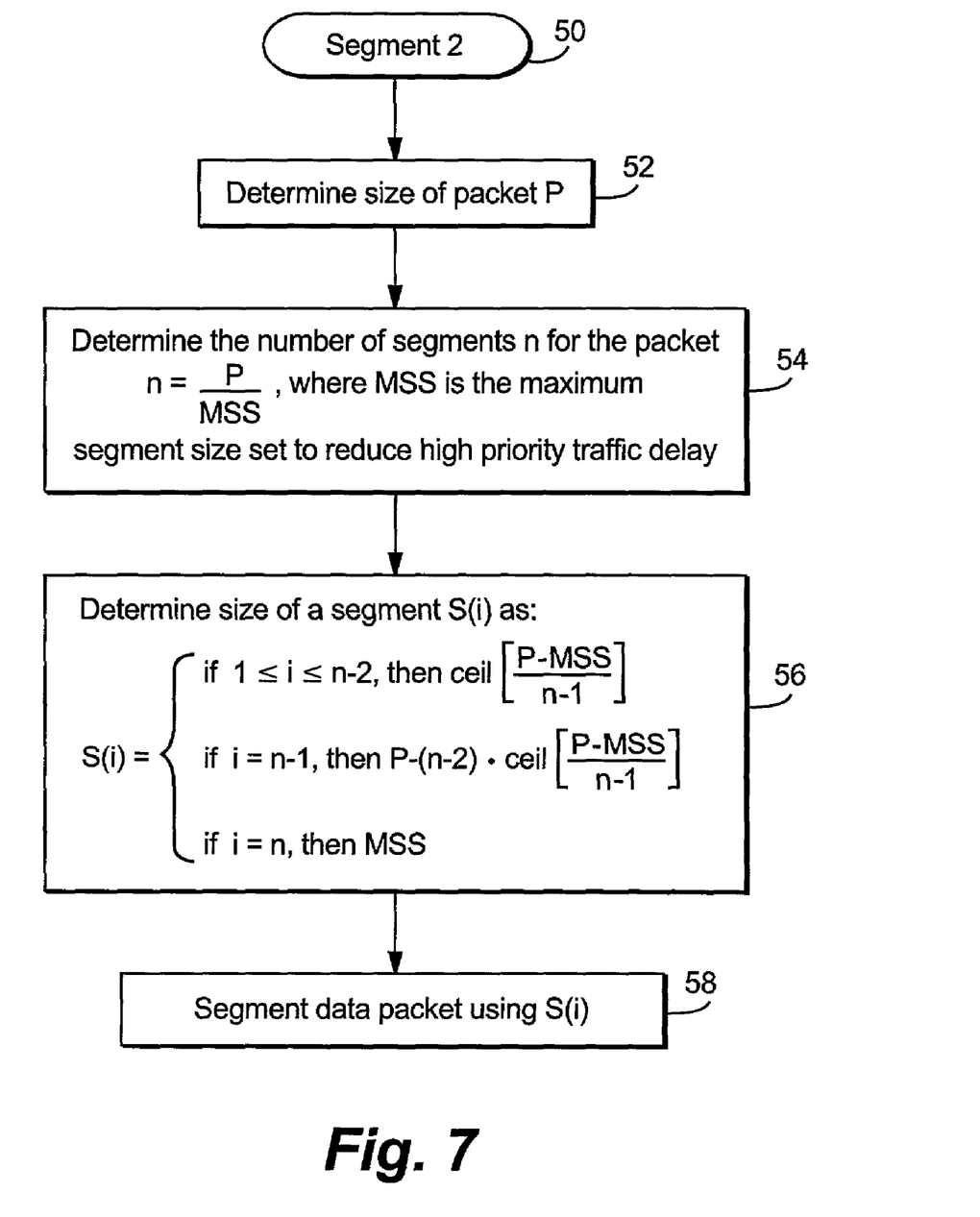
FIG. 7 is a flowchart illustrating details of a second example segmentation algorithm.

A second example, non-limiting segmentation algorithm is described in a "Segment 2" routine (block 50) shown in flowchart form in FIG. 7. Again, the size of the packet P is determined (block 52). The number of segments n is determined for the packet in accordance with $$n = ceil\left[\frac{P}{MSS}\right],$$

where MSS is the maximum segment size set to reduce high priority traffic delay (block 54). The size of the segment S(i) is determined in accordance with the following $$S(i) = \begin{cases} \text{if } 1 \leq i \leq n-2 \text{ then } ceil\left[\frac{P-MSS}{n-1}\right] \\ \text{if } i = n-1 \text{ then } P - (n-2) \cdot ceil\left[\frac{P-MSS}{n-1}\right] \\ \text{if } i = n \text{ then } MSS \end{cases}$$

(block 56). The data packet is segmented using the size relationships for S(i) set forth in block 56 (block 58).

Figure 8:
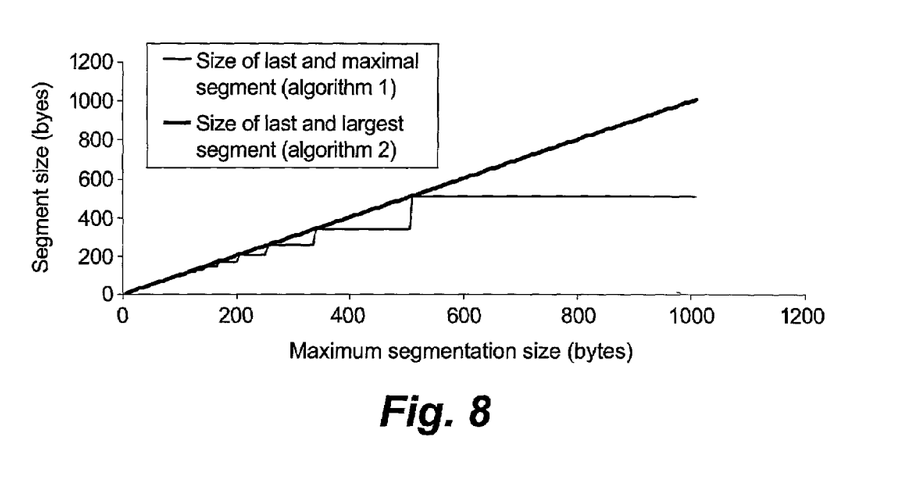
FIG. 8 is a graph illustrating segment sizes of last and maximal segments for segmentation algorithms.

FIG. 8 is a graph that shows the size of the last and largest segment for both algorithms, Segment 1 and Segment 2, depending upon the maximum segmentation size. Because the last segment is the largest one in both cases, minimal delays are incurred for both algorithms. The curve for the Segment 1 algorithm is below the curve of the Segment 2 algorithm. In other words, the largest and last segment size is smaller when using the Segment 1 algorithm as compared to the Segment 2 algorithm. Therefore, it can be expected that the Segment 1 algorithm outperforms the Segment 2 algorithm regarding voice delay. Regarding data delay, the Segment 2 algorithm outperforms the Segment 1 algorithm.

Figure 9:
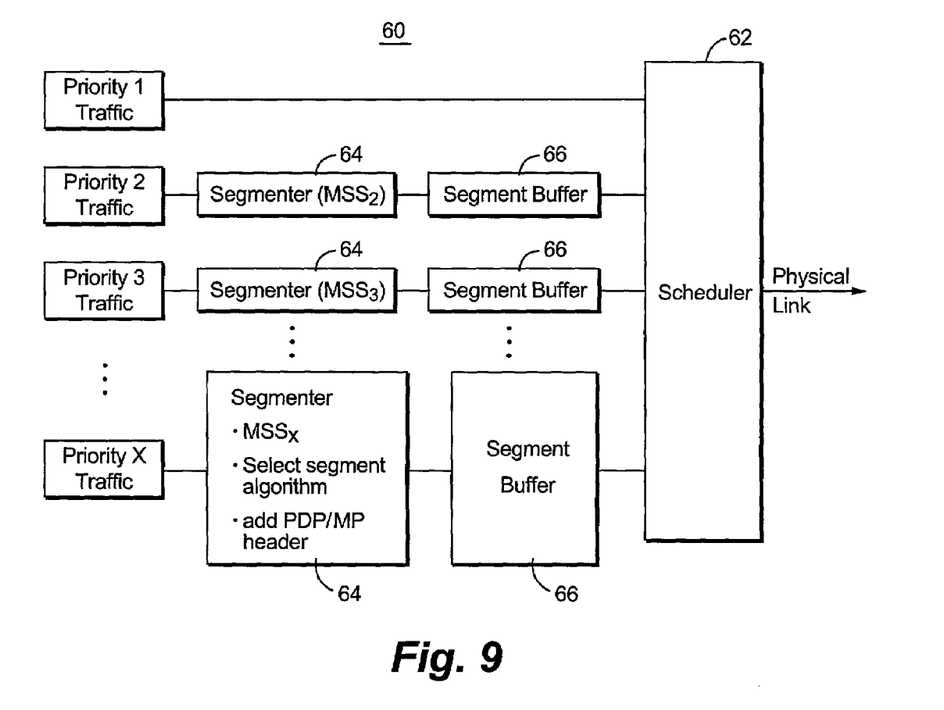
FIG. 9 illustrates an example apparatus for implementing a segmentation algorithm.

The present invention may be employed in any data transmitter. A simplified transmission apparatus 60 is shown in FIG. 9 for implementing the present invention. Multiple priority levels/traffic classes are shown 1, 2, 3, ... X. Priority 1 traffic is shown directly input to a packet scheduler 62. Other lower priority level traffic classes input their packets into a respective segmenter 64 which segments the packet in accordance with a segmentation algorithm and stores the segments in a buffer 66. The output of the segment buffer 66 is provided to the scheduler 62. The scheduler 62 multiplexes the priority 1 traffic packets with packet segments from one or more of the other lower priority level traffic inputs and sends the combined information out on a physical channel/link, using an appropriate protocol.

Each segmenter 64, as shown for the priority x traffic, has its own maximum segment size MSS which can be used, for example, in either of the above-described, example segmentation algorithms to determine optimal segment sizes. While a single segmentation algorithm may be employed, it may be desirable in certain situations to have plural segmentation algorithms available and to select one. As will be described below, one segmentation algorithm may be more optimal for minimizing, delays of a higher priority traffic class, while the other algorithm is more optimal for mining delay of a lower priority traffic class. The segmenter 64 also may add a fragmentation protocol header, e.g., PPP/multiprotocol (MP) header, to each segment before sending the segment to the buffer if an PPP/MP protocol is used. These headers permit reconstruction of the data packet from received segments at the receive side.

To illustrate how the example first and second segment algorithms reduce delays when two different traffic classes are carried over the same link, a simulation was conducted for a low priority class with large packets that need to be segmented and a high priority voice class with potentially short voice packets. The simulation was based on a 1920 kbps link (E1) that carries multiplexed voice-data traffic. Each high priority voice source transmits 144-byte packet every 20 milliseconds, and each low priority data source transmits 1013-byte packet every 20 milliseconds. The traffic mix includes the traffic of one data source and 80 voice sources. Overhead introduced by segmentation was neglected during the simulations because it does not influence the comparison.

Figure 10:
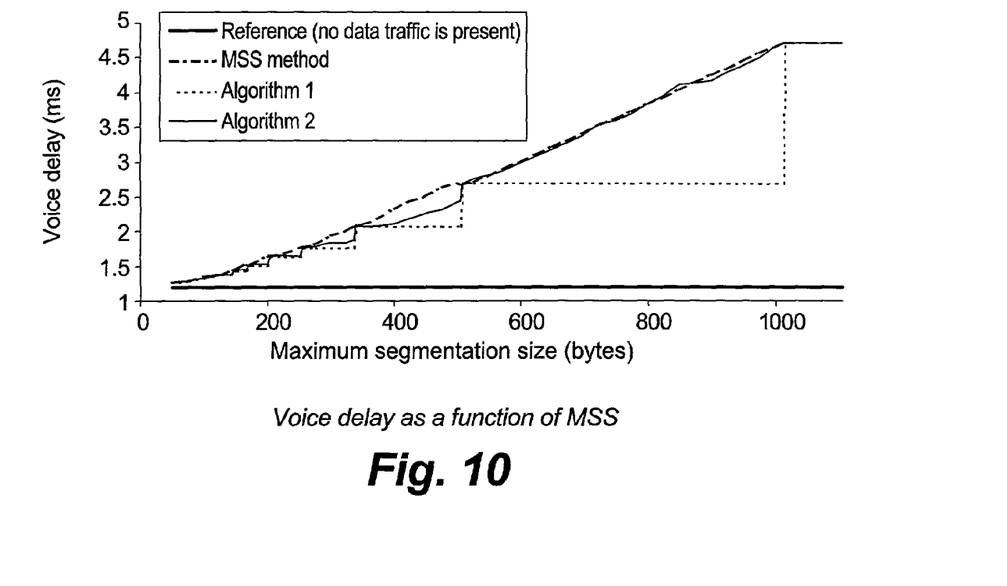
FIG. 10 is a graph illustrating voice delay as a function of a maximum segmentation size.
Figure 11:
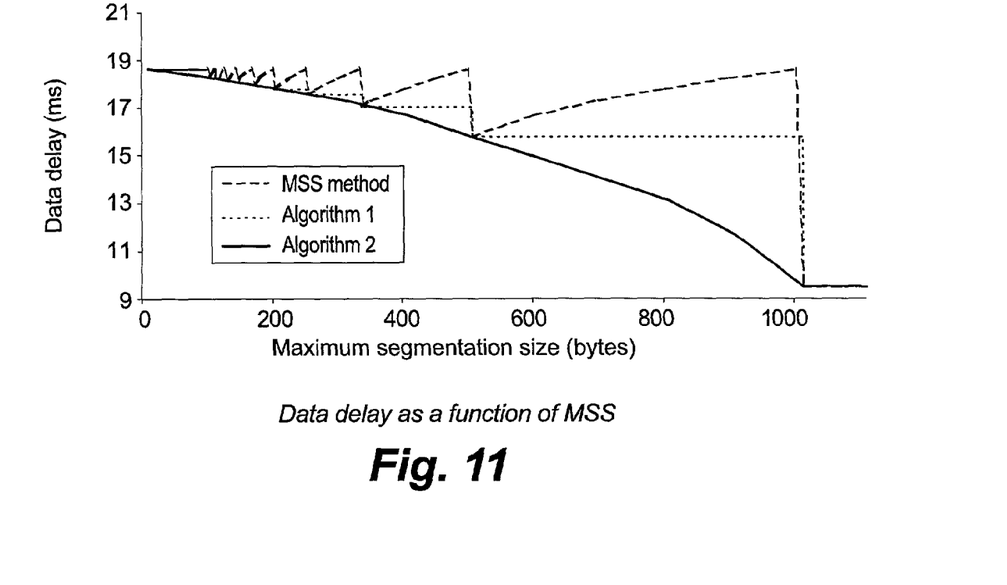
FIG. 11 is a graph illustrating data delay as a function of maximum segment size.

FIG. 10 shows for the simulation voice packet delay as a function of maximum segmentation size, and FIG. 11 shows data packet delay as a function of maximum segment size. From FIG. 10, it can be seen that voice packet delay as a function of maximum segmentation size is the best when segment algorithm 1 is applied. However, segment algorithm 2 still performed better than simply segmenting a data packet using the maximum segment size (MSS). In FIG. 11, it is apparent that the data delay is reduced the most if segment algorithm 2 is used. However, segment algorithm 1 is still better than the MSS method described in the background. Moreover, neither segmentation algorithm adds any additional complexity as compared to the MSS segmentation algorithm.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. A method for use in transmitting a data packet at a first priority level along with traffic from a second, higher priority level, comprising:
   determining a size of the data packet;
   determining a first segment size for the data packet and a second segment size for the data packet, where the first and second segment sizes are determined to reduce a delay either in transmitting the higher priority traffic or in transmitting the data packet;
   segmenting the data packet into plural segments at the first segment size and a last segment of the data packet at the second segment size; and
   transmitting the higher priority traffic along with the data packet segments.

2. The method in claim 1, wherein the first segment size is smaller than a maximum allowed segment size.

3. The method in claim 1, wherein the higher priority traffic is multiplexed with the segments over communications channel.

4. The method in claim 1, wherein the higher priority traffic and the segments are transmitted over a multilink channel.

5. The method in claim 1, wherein all of the data packet segments except the last segment are the first segment size.

6. The method in claim 5, wherein the last segment is the same size as or larger than the first segment size.

7. The method in claim 1, wherein the first segment size is less than the second segment size.

8. The method in claim 1, wherein there are three or more traffic priority levels, and for each at least two of the traffic priority levels the method comprises:
   determining a maximum segment size for a data packet at the traffic priority level;
   determining a size of the data packet;
   determining a first segment size for the data packet and a second segment size for the data packet using the determined maximum segment size;
   segmenting the data packet into plural segments at the first segment size and a last segment of the data packet at the second segment size, where the first and second segment sizes are determined to reduce a delay either in transmitting the higher priority traffic or in transmitting the data packet; and
   transmitting the higher priority traffic along with the data packet segments.

9. The method in claim 1, further comprising:
   determining a number of segments "n" for the data packet based on the packet size "P" and a predetermined segment size "MSS".

10. The method in claim 9, wherein the first segment size equals P/n, and wherein if P/n equals a first integer and a remainder, the segment size equals a second integer rounded up from the first integer.

11. The method in claim 9, wherein the second segment size is P/n, and wherein if P/n equals an integer and a remainder, the second segment size equals the integer.

12. The method in claim 9, wherein the size S(i) of each segment is determined as using a second approach as follows:

$$S(i) = \begin{cases} \text{if } 1 \leq i \leq n-2 \text{ then } \text{ceil}\left[\frac{P - MSS}{n-1}\right] \\ \text{if } i = n-1 \text{ then } P - (n-2) \cdot \text{ceil}\left[\frac{P - MSS}{n-1}\right] \\ \text{if } i = n \text{ then } MSS, \end{cases}$$

where ceil[ ] denotes rounding to a next larger integer.

13. Apparatus for use in transmitting a data packet at a first priority level along with traffic from a second, higher priority level, comprising:
   means for determining a size of the data packet;
   means for determining a first segment size for the data packet and a second segment size for the data packet, where the first and second segment sizes are determined to reduce a delay either in transmitting the higher priority traffic or in transmitting the data packet;
   means for segmenting the data packet into plural segments at the first segment size and a last segment of the data packet at the second segment size; and
   means for transmitting the higher priority traffic along with the data packet segments,
   wherein the first segment size is smaller than a maximum allowed segment size.

14. The apparatus in claim 13, wherein the means for transmitting multiplexes the higher priority traffic with the segments over communications channel.

15. The apparatus in claim 13, wherein the means for transmitting transmits the higher priority traffic and the segments over a multilink channel.

16. The apparatus in claim 13, wherein all of the data packet segments except the last segment are the first segment size.

17. The apparatus in claim 16, wherein the last segment is the same size as or larger than the first segment size.

18. The apparatus in claim 13, wherein the first segment size is less than the second segment size.

19. The apparatus in claim 13, wherein there are three or more traffic priority levels, and for each at least two of the traffic priority levels the apparatus comprises:
   means for determining a maximum segment size for a data packet at the traffic priority level;
   means for determining a size of the data packet;
   means for determining a first segment size for the data packet and a second segment size for the data packet using the determined maximum segment size;
   means for segmenting the data packet into plural segments at the first segment size and a last segment of the data packet at the second segment size, where the first and second segment sizes are determined to reduce a delay either in transmitting the higher priority traffic or in transmitting the data packet; and
   means for transmitting the higher priority traffic along with the data packet segments.

20. The apparatus in claim 13, further comprising:
   means for determining a number of segments "n" for the data packet based on the packet size "P" and a predetermined segment size "MSS".

21. The apparatus in claim 20, wherein the first segment size equals P/n, and wherein if P/n equals a first integer and a remainder, the segment size equals a second integer rounded up from the first integer.

22. The apparatus in claim 20, wherein the second segment size is P/n, and wherein if P/n equals an integer and a remainder, the second segment size equals the integer.

23. The apparatus in claim 20, wherein the size S(i) of each segment is determined as using a second approach as follows:

$$S(i) = \begin{cases} \text{if } 1 \leq i \leq n-2 \text{ then } ceil\left[\dfrac{P-MSS}{n-1}\right] \\ \text{if } i = n-1 \text{ then } P-(n-2)\cdot ceil\left[\dfrac{P-MSS}{n-1}\right] \\ \text{if } i = n \text{ then } MSS, \end{cases}$$

where ceil[ ] denotes rounding to a next larger integer.

24. Apparatus for use in transmitting a data packet at a first priority level along with traffic from a second, higher priority level, comprising:
   electronic circuitry configured to:
      determine a size of the data packet;
      determine a first segment size for the data packet and a second segment size for the data packet, where the first and second segment sizes are determined to reduce a delay either in transmitting the higher priority traffic or in transmitting the data packet; and
      segment the data packet into plural segments at the first segment size and a last segment of the data packet at the second segment size, and
   a transmitter for transmitting the higher priority traffic along with the data packet segments,
   wherein the first segment size is smaller than a maximum allowed segment size.

25. The apparatus in claim 24, wherein the transmitter is configured to multiplex the higher priority traffic with the segments over communications channel.

26. The apparatus in claim 24, wherein the transmitter is configured to transmit the higher priority traffic and the segments over a multilink channel.

27. The apparatus in claim 24, wherein all of the data packet segments except the last segment are the first segment size.

28. The apparatus in claim 27, wherein the last segment is the same size as or larger than the first segment size.

29. The apparatus in claim 24, wherein the first segment size is less than the second segment size.

30. The apparatus in claim 24, wherein there are three or more traffic priority levels, and for each at least two of the traffic priority levels the electronic circuitry is configured to:
   determine a maximum segment size for a data packet at the traffic priority level;
   determine a size of the data packet;
   determine a first segment size for the data packet and a second segment size for the data packet using the determined maximum segment size; and
   segment the data packet into plural segments at the first segment size and a last segment of the data packet at the second segment size, where the first and second segment sizes are determined to reduce a delay either in transmitting the higher priority traffic or in transmitting the data packet,
   wherein the transmitter is configured to transmit the higher priority traffic along with the data packet segments.

31. The apparatus in claim 24, wherein the electronic circuitry is configured to determine a number of segments "n" for the data packet based on the packet size "P" and a predetermined segment size "MSS".

32. The apparatus in claim 31, wherein the first segment size equals P/n and wherein if P/n equals a first integer and a remainder, the segment size equals a second integer rounded up from the first integer.

33. The apparatus in claim 31, wherein the second segment size is P/n, and wherein if P/n equals an integer and a remainder, the second segment size equals the integer.

34. The apparatus in claim 31, wherein the size S(i) of each segment is determined as using a second approach as follows:

$$S(i) = \begin{cases} \text{if } 1 \leq i \leq n-2 \text{ then} & ceil\left[\dfrac{P-MSS}{n-1}\right] \\ \text{if } i = n-1 \text{ then} & P-(n-2)\cdot ceil\left[\dfrac{P-MSS}{n-1}\right] \\ \text{if } i = n \text{ then} & MSS, \end{cases}$$

where ceil[ ] denotes rounding to a next larger integer.

* * * * *

UNITED STATES PATENT AND TRADEMARK OFFICE
CERTIFICATE OF CORRECTION

PATENT NO.        : 7,224,703 B2
APPLICATION NO.   : 10/012348
DATED             : May 29, 2007
INVENTOR(S)       : Csaba Antal et al.

It is certified that error appears in the above-identified patent and that said Letters Patent is hereby corrected as shown below:

On the Title Page, item (75), under "Inventors", in Column 1, Line 2, delete "(CH)" and insert -- (SE) --, therefor.

In Fig. 3, Sheet 3 of 7, above "Fig. 3", delete "sements" and insert -- segments --, therefor.

In Column 1, Line 55, delete "Multilik Protocol W)." and insert -- Multilink Protocol (MP). --, therefor.

In Column 7, Line 10, delete "Sand" and insert -- $S_1$ and --, therefor.

In Column 8, Line 13, delete "x" and insert -- X --, therefor.

In Column 8, Line 21, delete "minimizing," and insert -- minimizing --, therefor.

In Column 8, Line 22, delete "mining" and insert -- minimizing --, therefor.

In Column 12, Line 24, in Claim 32, delete "P/n" and insert -- P/n, --, therefor.

Signed and Sealed this

Tenth Day of June, 2008

JON W. DUDAS
*Director of the United States Patent and Trademark Office*